United States Patent
Loveall (10) Patent No.: US 10,926,798 B2
(45) Date of Patent: Feb. 23, 2021

(54) POTHOLE DISPLAY

(71) Applicant: Ford Global Technologies, LLC, Dearborn, MI (US)

(72) Inventor: Seth Loveall, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 108 days.

(21) Appl. No.: 16/258,989

(22) Filed: Jan. 28, 2019

(65) Prior Publication Data

US 2020/0239074 A1 Jul. 30, 2020

(51) Int. Cl.
*B62D 15/02* (2006.01)
*B60R 1/00* (2006.01)

(52) U.S. Cl.
CPC ........... *B62D 15/0295* (2013.01); *B60R 1/00* (2013.01); *B60R 2300/20* (2013.01); *B60R 2300/8093* (2013.01)

(58) Field of Classification Search
CPC ... B62D 15/0295; B60R 1/00; B60R 2300/20; B60R 2300/8093
See application file for complete search history.

(56) References Cited

U.S. PATENT DOCUMENTS

| | | | |
|---|---|---|---|
| 8,686,872 B2 | 4/2014 | Szczerba et al. | |
| 8,692,739 B2 | 4/2014 | Mathieu et al. | |
| 9,212,926 B2 | 12/2015 | Attard et al. | |
| 9,969,329 B2 | 5/2018 | Shenoy et al. | |
| 2009/0097038 A1* | 4/2009 | Higgins-Luthman | B60G 17/019 356/602 |
| 2014/0277902 A1* | 9/2014 | Koch | G07C 5/0808 701/29.1 |
| 2015/0179062 A1* | 6/2015 | Ralston | G08G 1/0145 701/117 |
| 2017/0076606 A1 | 3/2017 | Gupta et al. | |
| 2017/0089710 A1 | 3/2017 | Slusar | |
| 2017/0144669 A1* | 5/2017 | Spata | E01C 23/01 |
| 2018/0068495 A1* | 3/2018 | Chainer | B60R 11/04 |
| 2018/0118109 A1 | 5/2018 | Fujisawa et al. | |

FOREIGN PATENT DOCUMENTS

WO 2010062899 A1 6/2010

OTHER PUBLICATIONS

Balakuntala et al., "An Intelligent System to Detect, Avoid and Maintain Potholes: A Graph Theoretic Approach", arXiv:1305.5522v3, Sep. 18, 2013.
"Ford Unveils All-New Focus—Most Innovative, Dynamic and Exciting Ford Ever—20 Years on from Original Game-Changer", Ford Media Center, Apr. 10, 2018.

* cited by examiner

*Primary Examiner* — Mary Cheung
(74) *Attorney, Agent, or Firm* — Brandon Hicks; Bejin Bieneman PLC (57) ABSTRACT

Upon determining a position of a pothole relative to a predicted vehicle path, one or more lights in a linear arrangement of lights are actuated based on the position of the pothole relative to the vehicle path.

20 Claims, 5 Drawing Sheets

Wheel display characteristics – predicted to drive over pothole (first display characteristic)

Pothole display characteristics (second display characteristic)

Wheel display characteristics (first display characteristic)

Pothole display characteristics (second display characteristic)

Unilluminated light

FIG. 2B

Pothole display characteristics (second display characteristic)

Wheel display characteristics – Predicted to avoid pothole (Third display characterisitc)

POTHOLE DISPLAY

BACKGROUND

A vehicle may travel over a surface such as road, parking space, etc., that has irregularities such as potholes. Driving over road irregularities may cause discomfort for vehicle occupant(s) and/or cause wear and tear to vehicle components, e.g., suspension component(s).

DETAILED DESCRIPTION

Introduction

Disclosed herein is a method, comprising, upon determining a position of a pothole relative to a predicted vehicle path, actuating one or more lights in a linear arrangement of lights based on the position of the pothole relative to the vehicle path.

The arrangement of lights may be a row of lights.

One of the one or more lights may indicate the pothole.

One of the one or more lights may indicate a predicted position of a vehicle wheel.

The method may further comprise changing a display characteristic of the one or more lights upon predicting that the vehicle will drive over the pothole.

The display characteristic may be a color or a shape.

The method may further comprise outputting data to a human machine interface indicating to steer to one of a right or a left direction to avoid the pothole.

The method may further comprise predicting a vehicle path based on a vehicle orientation and a lateral acceleration of the vehicle; and determining the pothole position relative to the predicted vehicle path.

The method may further comprise determining two-dimensional location coordinates of the pothole based on data received from one or more vehicle sensors.

The method may further comprise determining two-dimensional location coordinates of the pothole and dimensions of the pothole based on data received from a remote computer.

Further disclosed herein is a computer including a processor and a memory. The memory stores instructions executable by the processor to, upon determining a position of a pothole relative to a predicted vehicle path, actuate one or more lights in a linear arrangement of lights based on the position of the pothole relative to the vehicle path.

The arrangement of lights may be a row of lights.

One of the one or more lights may indicate the pothole.

One of the one or more lights may indicate a predicted position of a vehicle wheel.

The instructions may further include instructions to change a display characteristic of the one or more lights upon predicting that the vehicle will drive over the pothole.

The display characteristic may be a color or a shape.

The instructions may further include instructions to output data to a human machine interface indicating to steer to one of a right or a left direction to avoid the pothole.

The instructions may further include instructions to predict a vehicle path based on a vehicle orientation and a lateral acceleration of the vehicle; and determine the pothole position relative to the predicted vehicle path.

The instructions may further include instructions to determine two-dimensional location coordinates of the pothole based on data received from one or more vehicle sensors.

The instructions may further include instructions to determine two-dimensional location coordinates of the pothole and dimensions of the pothole based on data received from a remote computer.

Further disclosed is a computing device programmed to execute any of the above method steps.

Yet further disclosed is a computer program product, comprising a computer readable medium storing instructions executable by a computer processor, to execute any of the above method steps.

System

A vehicle computer may be programmed to detect a pothole or the like on a road surface. Upon detecting the irregularity, the computer may further be programmed to actuate a vehicle human machine interface to represent a location or position of a pothole, e.g., by showing one or both of a first lateral position (as defined below) of a pothole from a road boundary or other landmark, and a second lateral position of vehicle wheel(s) from to the pothole. Advantageously, a vehicle user may steer the vehicle to avoid driving over the pothole(s) according to the indicated distance(s). A pothole, as the term is used herein, includes any type of abnormality (or irregularity) found on a ground surface such as a road, parking space, side walk, etc. The pothole may have various shapes such as a convex or any non-geometrical shape.

In one example, a vehicle computer can be programmed to, upon determining a lateral distance of the pothole from a vehicle, e.g., vehicle wheel(s), actuate, based on the lateral distance of the pothole, a first and a second light in an arrangement of lights, the first light having a first display characteristic and the second light having a second display characteristic. A light can be actuated to provide a display characteristic to indicate the lateral distance of a pothole or vehicle wheels, e.g., a first display characteristic indicating a position (or positions) of vehicle wheels and a second display characteristic indicating a position of a pothole.

Figure 1:
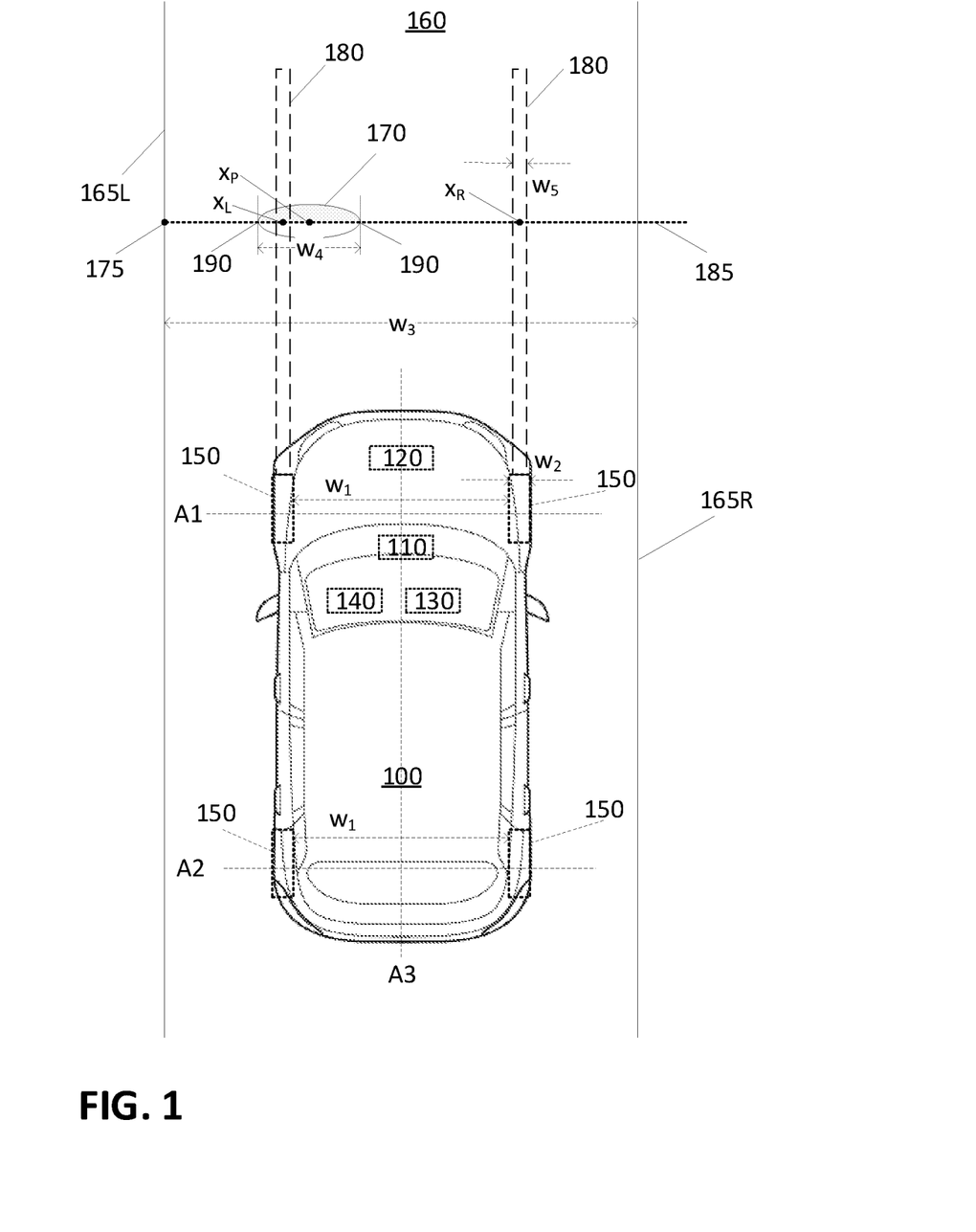
FIG. 1 is a block diagram of an example host vehicle on a road.

FIG. 1 illustrates a vehicle 100 which may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140. The vehicle 100 includes a plurality of wheels 150. For example, a sedan vehicle 100 typically includes two front wheels 150 positioned along a front lateral axis A1 and two rear wheels 150 positioned along a rear lateral axis A2. The wheels 150 positioned along a lateral axis A1 may have a lateral distance $w_1$ from one another. In one example, the lateral distance $w_1$ is a distance between inner sides of the wheels 150 (the surfaces of wheels 150 which face one another), as shown in FIG. 1. The wheels 150 may have a width $w_2$, e.g., 25 centimeter (cm). The vehicle 100 may include a longitudinal axis A3, as shown in FIG. 1, that is perpendicular to the lateral axes A1, A2. A vehicle 100 may have any number of wheels 150 with various arrangements, e.g., a truck may have two front wheels 150 and four rear wheels 150.

The computer 110 includes a processor and a memory such as are known. The memory includes one or more forms of computer-readable media, and stores instructions executable by the computer 110 for performing various operations, including as disclosed herein.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as a vehicle network, communication bus, etc. A LIDAR sensor 130 attached to a vehicle 100 exterior, e.g., on a roof, pillar, etc., of the vehicle 100, may provide object data by which the computer 110 can make determinations including relative locations, sizes, and shapes of pothole(s) 170, and/or objects, etc. The computer 110 may be programmed to detect potholes 170 using various techniques, e.g., image processing, AI (artificial intelligence)-based models, etc. In the present context, "location" data may include longitudinal, lateral, and/or altitude coordinates of a point with respect to a Cartesian coordinate system with an origin point, e.g., a reference point in the vehicle 100, a global reference point such as a GPS (Global Positioning System) reference point, etc.

Additionally or alternatively, with reference to FIG. 1, the computer 110 may be programmed to receive data pertaining to potholes 170 from a remote computer, e.g., a second vehicle, an infrastructure computer, etc. Thus, the computer 110 may be programmed to determine a location of a pothole 170 based on (i) vehicle 100 sensor 130 data, or (ii) data received from a remote computer including location coordinates and dimensions of the pothole 170. Additionally, the received data may include length, width, depth, shape, etc. of the potholes 170.

The HMI 140 may be configured to receive user input, e.g., during operation of the vehicle 100. Thus, the HMI 140 may be located in a passenger compartment of the vehicle 100. Moreover, the HMI 140 may be configured to present information to the user, e.g., location of a pothole 170 relative to the vehicle 100.

In addition, the computer 110 may be programmed to communicate through a wireless communication network with, e.g., a remote computer. The wireless communication network, which may include a Vehicle-to-Vehicle (V-to-V) and/or a Vehicle-to-Infrastructure (V-to-I) communication network, includes one or more structures by which the vehicles 100, the remote computer, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

The vehicle 100 may operate on a road 160 lane with a width $w_3$, e.g., 3.7 meters (m). In the present context, the width $w_3$ is a distance between right and left edges 165R, 165L of the road 160 lane on which the vehicle 100 operates. A road 160 may be single lane or multi-lane (or the vehicle 100 could operate in a driveway, parking lot, alley, etc., wherein the present principles could be applied). The vehicle 100 may drive over a pothole 170. A pothole 170 may have various shapes, depth, etc. In the present context, a width $w_4$ of a pothole 170 is a distance between lateral ends 190 of the pothole 170. Lateral ends 190 are nearest and farthest points on a perimeter of the pothole 170 on the ground surface relative to a reference point such as an edge of the road 160 lane, e.g., the left edge 165L. Further, the lateral ends 190 are defined so that a line 185 through them is perpendicular to a longitudinal axis A3 of the vehicle 100, at a time in which the vehicle 100 crosses the line 185. Because the line 185 is defined based on location(s) of the potholes 170, as the vehicle 100 moves along the road 160, the line 185 may be dynamically identified as a pothole 170 is detected.

In one example, the computer 110 may be programmed to receive vehicle 100 sensor 130 data including pothole 170 location, e.g., two-dimensional location coordinates, and/or dimensions, vehicle 100 location, detected road 160 edges 165R, 165L, etc., and to determine parameters a, b of a first degree equation $y_1 = ax + b$ that specifies the line 185 based on the received sensor 130 data. In the present context, x, $y_1$ are two-dimensional coordinates of points on the line 185 that is on the ground surface. The coordinates x, $y_1$ may be defined with respect to a Cartesian two-dimensional coordinate system with an origin point, e.g., based on conventional latitude, longitude GPS coordinates or the like. The computer 110 may be programmed to identify the line 185 based on two constraints: (i) the line 185 passes through a center point of the pothole 170, and (ii) the line 185 is perpendicular to the edge of the road, e.g., the left edge 165L. Further, the computer 110 may be programmed to identify a polynomial that specifies, with reference to the coordinate system, a reference line such as a boundary of the road 160, e.g., a lane boundary such as the left edge 165L. A reference point 175 can be defined where the line 185 and the road 160 reference line such as the left edge 165L intersect. Here should be noted, just as the line 185 may be defined and redefined as the vehicle 100 moves along the road 160, a point 175 may be defined and redefined.

In the present context, a lateral distance is a distance along the line 185 (i.e., a length of a segment of the line 185) of a specified point from the reference point 175. For example, a point $x_p$ can be defined as a center point (i.e., the point $x_p$ can be selected to be midway between the lateral ends 190) of the pothole 170; the distance from the point $x_p$ to the point 175 is a lateral distance in the present context. In this example, the right and left ends 190 of the pothole 170 have a distance $$\frac{w_4}{2}$$

from the center-point $x_p$ that can be determined by knowing the lateral position of the center point $x_p$ and the width $w_4$ of the pothole 170.

With respect to the example diagram of FIG. 1, the vehicle 100 wheels 150 may traverse respective wheel paths 180. The wheel paths 180 have widths $w_5$ that may be greater than or equal the wheel 150 width $w_2$. A wheel path 180 may have a straight or curved shape and may be predicted based on a vehicle 100 orientation, steering wheel angle, lateral speed, longitudinal speed, etc., using known techniques. An orientation of a vehicle 100 is a two-dimensional vector on the ground surface determining a heading of the vehicle 100 along the longitudinal axis A3. In one example, the computer 110 may be programmed to determine a path 180 polynomial including path 180 coefficients based on vehicle 100 sensor 130 data. A path 180 polynomial can be expressed as a cubic polynomial as follows: $y_2(x)=a_0+a_1x+a_2x^2+a_3x^3$, wherein coordinates $x$, $y_2$ may be defined in a two-dimensional Cartesian coordinate system such as mentioned above. Parameters $a_0$, $a_1$, $a_2$, $a_3$ may be determined by, e.g., the vehicle 100 computer 110. The points $x_R$ and $x_L$ on the line 185 are which centers of the right and left front wheels 150 are predicted to pass.

In the example illustrated by FIG. 1, a vehicle 100 wheel 150 drives over a pothole 170 when the lateral distance of the pothole 170 center point $x_p$ to the respective wheel 150 is less than half of pothole 170 lateral width $$\left(\frac{w_4}{2}\right).$$

Thus, in the example of FIG. 1, the left wheel 150 drives over the pothole 170, whereas the right wheel 150 crosses the line 185 without driving over the pothole 170. The computer 110 may be programmed to determine that a vehicle 100 wheel 150 drives over a pothole 170 when a lateral position of the pothole 170 to the predicted path 180 of the respective vehicle 100 wheel 150 is less than half of pothole 170 lateral dimension, e.g., $$|x_L - x_P| < \frac{w_4}{2}.$$

Figure 2A:
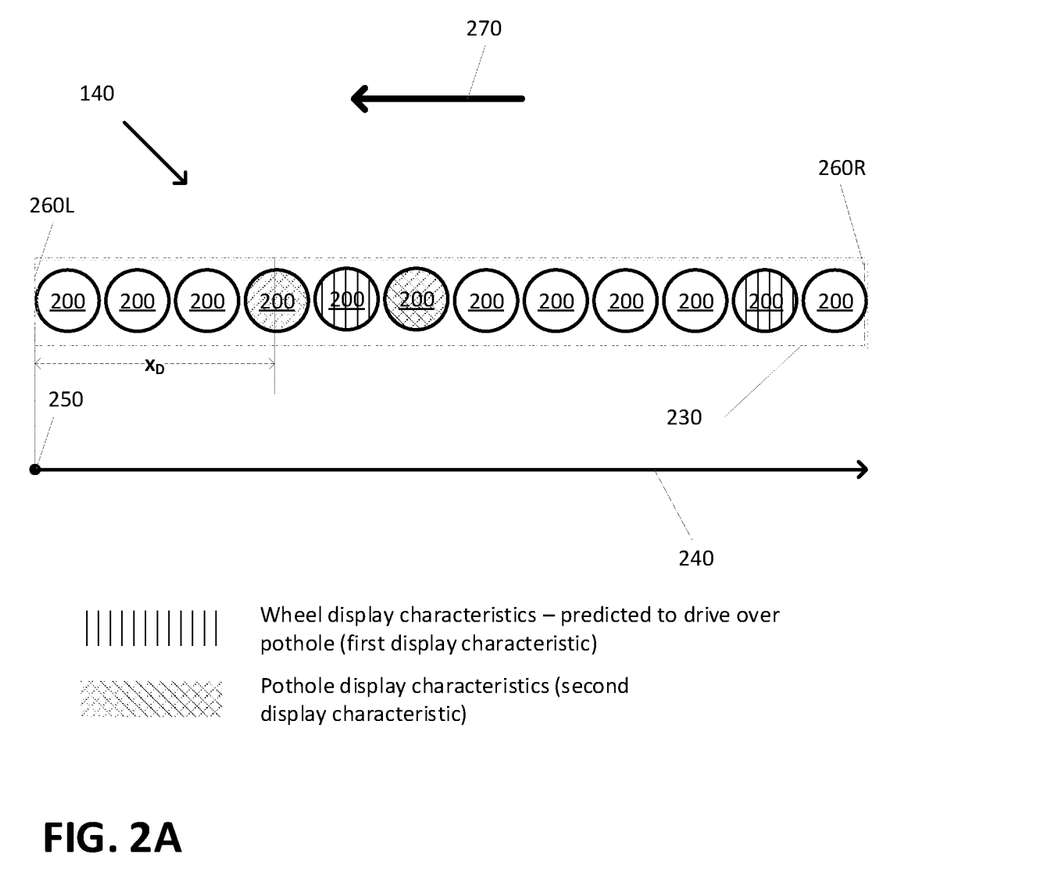
FIG. 2A is a block diagram of an example human machine interface outputting color characteristics to show a predicted location of a pothole.

With reference to FIGS. 1-2A, the vehicle 100 computer 110 can be programmed to, upon determining a lateral position of the pothole 170 relative to a vehicle 100 path 180, actuate, based on the lateral distance of the pothole 170 from the vehicle 100 path(s) 180, one or more lights 200 in an arrangement 230 of lights 200. For example, the computer 110 may be programmed to actuate a first light 200 having a first display characteristic and a second light 200 having a second display characteristic. The computer 110 may be programmed to actuate the HMI 140 to illuminate the lights 200 based on the first and second display characteristics.

In the present context, an "arrangement" of lights 200, e.g., the arrangement 230, is a shape or pattern, e.g., a row, of lights 200 included in the HMI 140. The arrangement 230 may be based on a physical location of lights 200, e.g., one or more LEDs (Light Emitting Diode), mounted in a linear pattern, a software-controlled display of lights 200, e.g., on a LCD (Liquid Crystal Display), and/or any other type of display included in the vehicle 100 HMI 140.

Figure 2B:
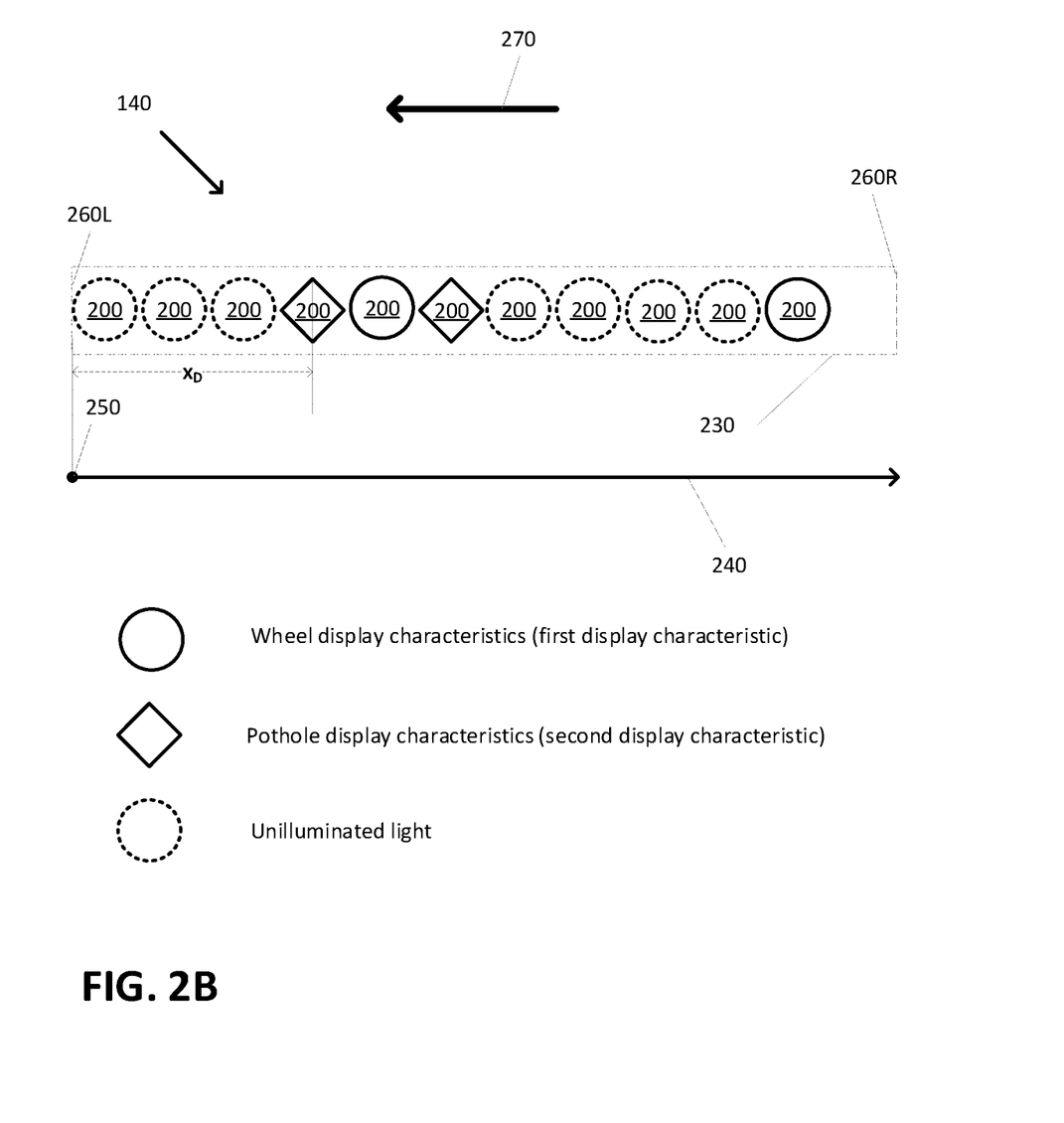
FIG. 2B is a block diagram of an example human machine interface outputting shape characteristics to show a predicted location of a pothole.

In the present context, a "display characteristic," e.g., the first and second display characteristics, include a color and/or a shape. For example, the first and second display characteristics may be colors "yellow" and "red." Additionally or alternatively, as shown in FIG. 2B, the first and second display characteristics may be circular and rectangular shapes of illuminated lights 200. Additionally, or alternatively, the display characteristics may include an activation pattern such as blinking, solid turned on or off, etc., and/or various illumination intensities, etc.

A position $x_D$ of a light 200 in an arrangement 230, e.g., a lateral position of a light 200 relative to an HMI axis 240 with an origin point 250, may correspond to the position $x_p$ of the pothole 170. In one example, the arrangement 230 has a right and a left end 260R, 260L, which can correspond to the road 160 lane edges 165R, 165L, as shown in FIGS. 1-2.

In one example, a lateral position of a light 200 with respect to the axis 240 may be proportional (or as close to proportional as possible) to a point on the line 185 shown in FIG. 1. For example, with an arrangement 230 having n lights 200, each light 200 representing a segment along the line 185 having a width equal to $$\frac{w_3}{n}$$

(possibly with a ceiling function, i.e., a function that returns a smallest integer number greater than the respective real number, applied thereto). With respect to Equation (1), the computer 110 may be programmed to determine a display light 200 position $x_D$ with respect to the axis 240 associated with a lateral coordinate $x$ with respect to the line 185 on the road 160 based on the road width $w_3$ and the number n of the lights 200 in the arrangement 230. In this example, a light 200 position $x_D$ is a number between 1 and n, e.g., obtained as follows:

$$x_D = \text{ceiling}\left(\frac{x \cdot n}{w_3}\right) \quad (1)$$

In one example, the computer 110 may be programmed to actuate a light 200 with a position $x_D$ with respect to the axis 240 to display the first display characteristic upon determining that a lateral distance x which corresponds to the light 200 position $x_D$ is a point in which the wheel 150 path 180 crosses the line 185. The computer 110 may be programmed to actuate a light 200 with a position $x_D$ with respect to the axis 240 to display the second display characteristic upon determining that a lateral distance x associated with the light 200 position $x_D$ is a point in a pothole 170; otherwise the computer 110 may actuate the light 200 to turn off or display a neutral display characteristic, e.g., a gray color.

Additionally or alternatively, if the computer 110 may be programmed to determine that a lateral position $x_D$ of a light 200 corresponds to both path 180 and a pothole 170 (e.g., FIG. 1 shows the left wheel 150 is expected to drive over the pothole 170). Then, the computer 110 may be programmed to actuate the respective light 200 to display a first display characteristic, e.g., blinking yellow color. In this example, a blinking yellow color of a light 200 may indicate a predicted driving of a corresponding wheel 150 over a pothole 170.

As discussed above, the computer 110 may be programmed to predict the path 180 based on the vehicle 100 orientation, lateral acceleration, etc. The computer 110 may be programmed to change the display characteristics of the lights 200 based on the predicted path 180. For example, upon changing a steering angle of the vehicle 100, the computer 110 may update the predicted path 180 polynomial. As a result of a change in the predicted path 180 polynomial, the computer 110 may be programmed to update the display characteristics of the lights 200, e.g., based on Equation (1) as discussed above.

Upon displaying first and second display characteristics based on the predicted path 180, position of the pothole 170, etc., a user can provide input, e.g., via a steering wheel, gas pedal, and/or a brake pedal to maneuver the vehicle 100 to avoid a pothole. The computer 110 may be further programmed to provide output to the HMI 140 to assist a vehicle user in providing input to the computer 110 via the vehicle 100 HMI 140, e.g., to further actuate lights 200 of the HMI 140 based on changed lateral distances of paths 180 from a pothole 170 as the vehicle 100 is maneuvered. In one example, the computer 110 may be programmed to output data to the HMI 140 indicating to steer to a right or left direction to avoid the detected pothole 170, e.g., by showing an arrow 270 to a right or left direction parallel to the arrangement 230.

In one example, upon determining that at least a vehicle 100 wheel 150 is predicted to drive over a pothole 170, the computer 110 may be programmed to determine a maneuver to avoid the pothole 170 including one of (i) placing the right and left wheels 150 on a right side of the pothole 170 (i.e., the right and left wheels 150 crossing the line 185 between the pothole 170 location and the right edge 165R of the road 160), (ii) placing the right and left wheels 150 on a left side of the pothole 170 (i.e., the right and left wheels 150 crossing the line 185 between the pothole 170 location and the left edge 165L of the road 160), or (iii) placing the right wheel 150 between the pothole 170 location and the right edge 165R of the road 160, and the left wheel 150 between the pothole 170 location and the left edge 165L of the road 160.

In one example, the computer 110 may be programmed to determine the maneuver to place both right and left wheels 150 between the pothole 170 and the right edge 165R upon determining that a lateral distance of the pothole 170 (or a right end 190 thereof) to the right edge 165R is greater than the vehicle width $w_1$.

In one example, the computer 110 may be programmed to determine the maneuver to place both right and left wheels 150 between the pothole 170 and the left edge 165L upon determining that a lateral position $x_p$ of the pothole 170 (or a left end 190 thereof) to the left edge 165L is greater than the vehicle 100 width including wheels 150 width (i.e., $w_1+2w_2$); otherwise the computer 110 may be programmed to determine a maneuver of the vehicle 100 crossing the line 185 while the pothole 170 is between the right and left wheels 150. The computer 110 may be programmed to output data to the HMI 140 based on the determined maneuver, e.g., displaying an arrow to a right or left direction on the HMI 140.

Figure 3:
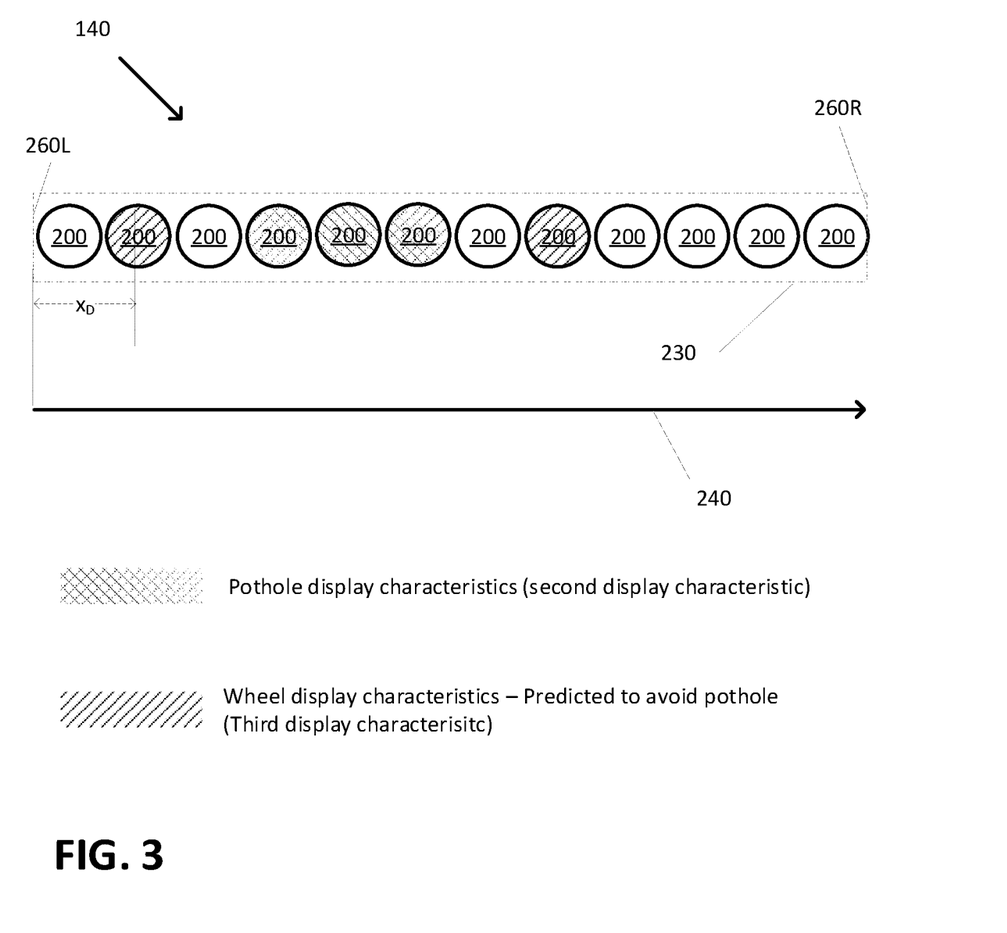
FIG. 3 is a block diagram of the human machine interface of FIG. 2A showing that the vehicle is expected to avoid the pothole.

FIG. 3 shows an example scenario in which the vehicle 100 wheels are predicted to avoid the pothole 170. The computer 110 may be programmed to actuate the first light(s) 200 having a third display characteristic, e.g., a green color, and the second light(s) 200 having the second characteristic, e.g., a red color. In one example scenario, the computer 110 may output data, as shown in FIG. 2A, predicting that the vehicle 100 wheel 150 may drive over the pothole 170. Upon receiving a change of steering angle, etc., the computer 110 may update the wheel(s) 150 path 180. Then, the computer 110 may be programmed to predict based on the updated path 180 that the wheels 150 may avoid the pothole 170, e.g., as shown in FIG. 3.

Processing

Figure 4:
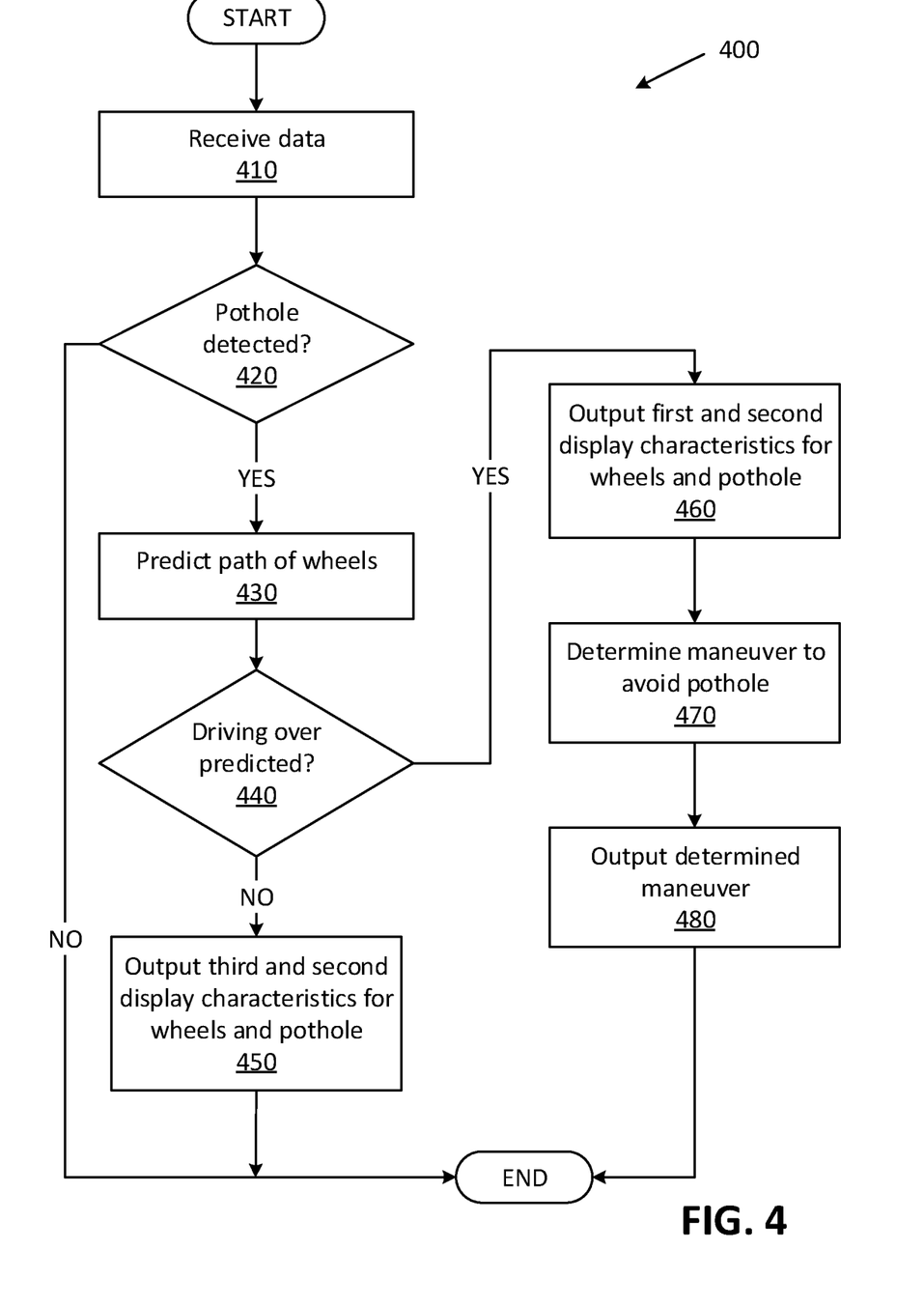
FIG. 4 is a flowchart of an exemplary process for operating the vehicle human machine interface.

FIG. 4 shows a flowchart of an exemplary process 400 for operating the HMI 140. The vehicle 100 computer 110 may be programmed to execute blocks of the process 400.

The process 400 begins in a block 410, in which the computer 110 receives, e.g., via a V-to-I communication network, data such as sensor 130 data from the vehicle 100 sensor(s) 130, and/or pothole 170 location data from a remote computer such as a second vehicle computer, a remote infrastructure computer, etc., vehicle 100 operational data (e.g., as available on a CAN bus or the like) such as a current and/or commanded steering angle, etc.

Next, in a decision block 420, the computer 110 determines whether a pothole 170 is detected. The computer 110 may be programmed to detect a pothole 170 based on the vehicle 100 sensor 130 data, and/or pothole 170 location data received from a remote computer. For example, the computer 110 may be programmed to detect a pothole 170 within a field of view of a vehicle 100 camera sensor 130 based on data received from the camera sensor 130, from a lidar, etc., according to known object detection techniques. If the computer 110 determines that a pothole 170 is detected, the process 400 proceeds to a block 430; otherwise the process 400 ends, or alternatively returns to the block 410, although not shown in FIG. 4.

In the block 430, the computer 110 predicts the path 180 of wheels 150. The computer 110 may be programmed to determine a path 180 polynomial for each of the wheels 150 based on the vehicle 100 orientation, steering angle, lateral acceleration, etc. The computer 110 may be programmed to predict the paths 180 of the wheels 150 further based on the vehicle 100 width $w_1$.

Next, in a decision block 440, the computer 110 predicts whether a vehicle 100 wheel 150 may drive over the detected pothole 170. As discussed above, the computer 110 may be programmed to predict whether a vehicle 100 wheel 150 may drive over the pothole 170 based on a lateral position (i.e., a location on the line 185) of a point $x_p$ of the pothole 170 and the positions $x_L$, $x_R$ at which respective paths 180 of the wheels 150 are predicted to cross the line 185. If the computer 110 predicts that one or more vehicle 100 wheels 150 will drive over the pothole 170, then the process 400 proceeds to a block 460; otherwise the process 400 proceeds to a block 450.

In the block 450, the computer 110 actuates the lights 200 with the third and second display characteristics, e.g., green and red colors, for the predicted position of wheels 150 and the pothole(s) 170. The computer 110 may be programmed to identify a light 200 corresponding to a point on line 185 based on Equation (1), as discussed above. Further, the computer 110 may be programmed to identify the display characteristic based on the lateral position $x_p$ of the pothole 170 and the lateral positions $x_L$, $x_R$ of the locations at which the paths 180 are predicted to cross the line 185. Following the block 450, the process 400 ends, or alternatively returns to the block 410, although not shown in FIG. 4.

In the block 460, the computer 110 actuates the lights 200 with the first and second display characteristics, e.g., yellow and red colors, for the predicted position of wheels 150 and the pothole(s) 170. The computer 110 may be programmed to identify a light 200 corresponding to a point on line 185 based on Equation (1), and to identify the display characteristics based on the lateral position $x_p$ of the pothole 170 and the lateral positions $x_L$, $x_R$ of the locations in which the paths 180 are predicted to cross the line 185.

Next, in a block 470, the computer 110 determines a maneuver to avoid the pothole(s) 170. As discussed above, the computer 110 may be programmed to determine the maneuver based on the lateral position $x_p$ of the pothole 170, the width $w_4$ of the pothole 170, the width $w_3$ of the road 160, the width $w_1$ of the vehicle 100, and/or the width $w_2$ of the wheel(s) 150.

Next, in a block 480, the computer 110 outputs the determined maneuver, e.g., displaying an arrow 270 (see FIGS. 2A-2B) to a right direction or an arrow 270 to a left direction on the HMI 140 to indicate a need for a lateral move to a right or left direction.

Following the block 480, the process 400 ends, or returns to the block 410, although not shown in FIG. 4.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic®, Java Script®, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
upon determining a position of a pothole relative to a predicted path of a vehicle, actuating one or more lights in a linear arrangement of lights based on the position of the pothole relative to the predicted path of the vehicle, wherein the linear arrangement of lights is a row of lights that are displayed in a human machine interface located in a passenger compartment of the vehicle.

2. The method of claim 1, wherein one of the one or more lights indicates the pothole.

3. The method of claim 1, wherein one of the one or more lights indicates a predicted position of a vehicle wheel.

4. The method of claim 1, further comprising changing a display characteristic of the one or more lights upon predicting that the vehicle will drive over the pothole.

5. The method of claim 4, wherein the display characteristic is a color or a shape.

6. The method of claim 1, further comprising outputting data to a human machine interface indicating to steer to one of a right or a left direction to avoid the pothole.

7. The method of claim 1, further comprising predicting the path based on a vehicle orientation and a lateral acceleration of the vehicle; and determining the pothole position relative to the predicted path of the vehicle.

8. The method of claim 1, further comprising determining two-dimensional location coordinates of the pothole based on data received from one or more vehicle sensors.

9. The method of claim 1, further comprising determining two-dimensional location coordinates of the pothole and dimensions of the pothole based on data received from a remote computer.

10. A computer, including a processor and a memory, the memory storing instructions executable by the processor to:
upon determining a position of a pothole relative to a predicted path of a vehicle, actuate one or more lights in a linear arrangement of lights based on the position of the pothole relative to the predicted path of the vehicle, wherein the linear arrangement of lights is a row of lights that are displayed in a human machine interface located in a passenger compartment of the vehicle.

11. The computer of claim 10, wherein one of the one or more lights indicates the pothole.

12. The computer of claim 10, wherein one of the one or more lights indicates a predicted position of a vehicle wheel.

13. The computer of claim 10, wherein the instructions further include instructions to change a display characteristic of the one or more lights upon predicting that the vehicle will drive over the pothole.

14. The computer of claim 13, wherein the display characteristic is a color or a shape.

15. The computer of claim 10, wherein the instructions further include instructions to output data to a human machine interface indicating to steer to one of a right or a left direction to avoid the pothole.

16. The computer of claim 10, wherein the instructions further include instructions to predict the path based on a vehicle orientation and a lateral acceleration of the vehicle; and determine the pothole position relative to the predicted path of the vehicle.

17. The computer of claim 10, wherein the instructions further include instructions to determine two-dimensional location coordinates of the pothole based on data received from one or more vehicle sensors.

18. The computer of claim 10, wherein the instructions further include instructions to determine two-dimensional location coordinates of the pothole and dimensions of the pothole based on data received from a remote computer.

19. The method of claim 1, further comprising actuating each of the one or more lights in the linear arrangement of lights based on (i) a number of lights included in the linear arrangement, (ii) a road width, and (iii) a lateral position of the respective light.

20. The computer of claim 10, wherein the instructions further include instructions to actuate each of the one or more lights in the linear arrangement of lights based on (i) a number of lights included in the linear arrangement, (ii) a road width, and (iii) a lateral position of the respective light.

* * * * *